United States Patent Office

3,290,294
Patented Dec. 6, 1966

1

3,290,294
17α-OXYGENATED 2,3-EPITHIO-5α-PREGNANES AND PRODUCTION THEREOF
Taichiro Komeno, Osaka, Japan, assignor to Shionogi & Co., Ltd., Osaka, Japan
No Drawing. Filed Mar. 24, 1966, Ser. No. 537,026
Claims priority, application Japan, Dec. 19, 1961, 36/46,266
28 Claims. (Cl. 260—239.5)

The present application is a continuation-in-part of copending application Ser. No. 520,868, filed Jan. 17, 1966, which is a division of copending application Ser. No. 390,233, filed Aug. 17, 1964, now U.S. Patent No. 3,230,215, which is a continuation-in-part of application Ser. No. 366,594, filed May 11, 1964, which is a continuation-in-part of applications Ser. Nos. 244,876 and 327,481, filed Dec. 17, 1962 and Dec. 2, 1963, respectively, the last three-enumerated applications being now abandoned.

The present invention relates to 17α-oxygenated 2,3-epithio-5α-pregnanes and production thereof. More particularly, it relates to 17α-oxygenated 2,3-epithio-5α-pregnanes represented by the general formula:

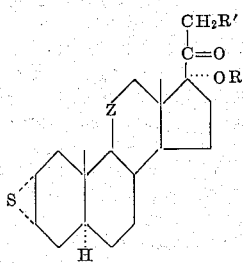

wherein R is a hydrogen atom or a lower alkanoyl group (e.g. formyl, acetyl, propinoyl, butyryl, isobutyrl, valeryl, isovaleryl, trimethylacetyl, caproyl, t-butylacetyl, enanthoyl, capryloyl), R' is a hydrogen atom, a hydroxyl group or a lower alkanoyloxy group (e.g. formyloxy, acetyloxy, propionyloxy, butyryloxy, isobutryloxy, valeryloxy, isovaleryloxy, trimethylacetyloxy, caproyloxy, t-butylacetyloxy, enanthoyloxy, capryloyloxy), and Z is a methylene group, a carbonyl group, a hydroxymethylene group (e.g. β-hydroxymethylene, α-hydroxymethylene) or a lower alkanoyloxymethylene group (e.g. β-acetyloxymethylene, α-acetylomethylene), and the process for preparing thereof.

A basic object of the present invention is to embody the said 17α-oxygenated 2,3-epithio-5α-pregnanes of Formula I. Another object of this invention is to embody the 17α-oxygenated 2,3-epithio-5α-pregnanes (I) having peculiar hormonal activities. A further object of the invention is to embody a process for preparing the 17α-oxygenated 2,3-epithio-5α-pregnanes (I). These and other objects will be apparent to those conversant with the art to which the present invention pertains from the subsequent description.

The substantial conversion in the process of the present invention is represented by the following scheme showing only the A-ring of the steroid nucleus:

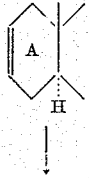

2

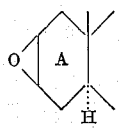

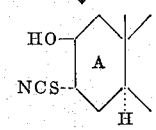

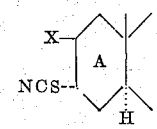

wherein X is a halogen atom (e.g. chlorine, bromine, iodine), a lower alkanoyloxy group (e.g. acetyloxy, propionyloxy, butyryloxy), a lower alkanesulfonyloxy group (e.g. methanesulfonyloxy, ethanesulfonyloxy), a benzenesulfonyloxy group or a lower alkylbenzene sulfonyloxy group (e.g. toluenesulfonyloxy).

Examples of the starting 17α-oxygenated 5α-pregn-2-ene (II) include 17α-hydroxy-5α-pregn-2-en-20-one, its 17-acetate and 17-propionate, 17α-hydroxy-5α-pregn-2-ene-11,20-dione and its 17-acetate, 11β,17α-dihydroxy-5α-pregn-2-en-20-one, its 17-acetate and 11,17-diacetate, 11α,17α-dihydroxy-5α-pregn-2-en-20 - one, 17α,21-dihydroxy-5α-pregn-2-en-20-one, its 21-acetate, 11β,17α,21-trihydroxy-5α-pregn-2-en-20-one, 11α,17α,21 - trihydroxy - 5α-pregn-2-en-20-one, 17α,21 - dihydroxy-5α-pregn-2-ene-11, 20-dione, its 21-acetate and 21-propionate, etc.

According to the present invention, the starting 17α-oxygenated 5α-pregn-2-ene steroid (II) is first subjected to epoxy linkage-formation. The epoxy linkage-formation may be effected by successive conversion comprising halohydrin-formation and dehydrohalogenation. The halohydrin-formation is carried out by treatment with a halogenating agent such as hypohalogenic acid (e.g. hypochlorous acid), an N-halo carbonamide or dicarbonimide (e.g. N-bromoacetamide, N-bromosuccinimide, N-iodosuccinimide, N-chlorophthalimide), a halonium-releasing composition (e.g. iodine and silver acetate, bromine and silver benzoate, bromine and methanol) or the like in an inert solvent (e.g. water, methanol, acetic acid, chloroform, dichloromethane, carbon tetrachloride, ether, benzene) at a temperature from about 0° C. to the boiling point of the solvent used, within about 10 hours, optionally in the presence of a catalyst such as an acid (e.g. perchloric acid, hydrobromic acid, acetic acid), whereby 3α-halo-2β-hydrin linkage is accomplished. The dehydrohalogenation is carried out by treatment of the halohydrin with a base (e.g. alumina, pyridine, sodium bicarbonate, potassium carbonate, calcium hydroxide, potassium acetate, sodium methoxide, potassium hydroxide) in an inert solvent (e.g. water, methanol, ethanol, ispropanol, acetone) at a temperature from room temperature (10 to 20° C.) to the boiling point of the solvent used, within about 24 hours, whereby 2β,3β - epoxy linkage (III) is accomplished. Alternatively, the said epoxy linkage-formation can be attained in one step wherein the said halogenating agent is subjected to the reaction in the presence of a base, preferably an organic base (e.g. pyridine), whereby the once produced 3α-halo-2β-hydrin is simultaneously dehydrogenated to conduct to the objective 2β,3β-epoxide (III). Thus, the present epoxy linkage-formation may be attained by treatment with a combination of a halogenating agent and a base wherein the treatment with a base may be carried out simultaneously or in order.

The epoxide (III) is then subjected to thiocyanatohydrin formation. The reaction is carried out substantially by the action of thiocyanic acid. Practically, the reaction may be carried out with thiocyanic acid or its salt (e.g. sodium thiocyanate) in an inert solvent (e.g. water, methanol, acetone, ether, tetrahydrofuran, dioxane, chloroform, dichloromethane) at a temperature from about 0° C. to the boiling point of the solvent used within about 5 days, if required, in the presence of catalytic influence of an acid (e.g. acetic acid) or a base (e.g. pyridine).

The resultant 3α-thiocyanato-2β-hydrin (IV) is then subjected to epithio linkage-formation as it is or after converting the 2β-hydroxyl group into a halogen atom or an acyloxy group (the term "acyloxy" being intended to mean lower alkanoyloxy, lower alkanesulfonyloxy, benzenesulfonyloxy and lower alkylbenzenesulfonyloxy, inclusively). For the previous conversion of the hydroxyl group into a halogen atom, the thiocyanatohydrin (IV) may be treated in a per se conventional halogenation procedure. The conversion of the hydroxyl group into an acyloxy group may be performed by treating the thiocyanatohydrin (IV) in a per se conventional acylation procedure.

The epithio linkage-formation may be effected by reacting the free (IV) or halogenated or acylated (V) thiocyanatohydrin with a basic agent (e.g. alumina, pyridine, sodium bicarbonate, calcium hydroxide, potassium carbonate, sodium acetate, sodium methoxide, potassium hydroxide) in an inert solvent (e.g. methanol, ethanol, propanol, benzene, toluene, petroleum ether, diethylene glycol dimethyl ether) whereby 2α,3α-epithio linkage is produced. It is generally preferred to carry out the reaction at a relatively mild condition, i.e. at a temperature not higher than 100° C. within about 5 days. It is notable that the epithio linkage-formation via previously halogenated or acylated derivative (V) provides neither convenience nor better yield than the process using free thiocyanatohydrin (IV).

In the course of the above conversion route, the hydroxy group or the lower alkanoyloxy group at 17-, 21- or, in some case, 11-position may be interchanged simultaneously or optionally. However, the substantial conversion on the A-ring as illustrated above is not affected by such alteration at 17-, 21- or 11-position.

Examples of the resulting 17α-oxygenated 2,3-epithio-5α-pregnane (I) include 2α,3α-epithio-17α-hydroxy-5α-pregnan-20-one, its 17-formate, acetate, propionate, butyrate, valerate and enanthate, 2α,3α-epithio-17α-hydroxy-5α-pregnane-11,20-dione and its 17-acetate, 2α,3α-epithio-11β,17α-dihydroxy-5α-pregnan-20-one, its 17-acetate and 11,17-diacetate, 2α,3α-epithio-11α,17α-dihydroxy-5α-pregnan-20-one, 2α,3α - epithio-17α,21-dihydroxy-5α-pregnan-20-one and its 21-acetate, 2α,3α-epithio-11β,17α,21-trihydroxy-5α-pregnan-20-one, its 21-formate, acetate, propionate and trimethylacetate, 2α,3α-epithio-11α,17α,21-trihydroxy-5α-pregnan-20-one, 2α,3α - epithio-17α,21-dihydroxy-5α-pregnane-11,20-dione, its 21-acetate, propionate, valerate, trimethyl-acetate, t-butylacetate, caproate, enanthate and caprylate, etc.

The 17α-oxygenated 2,3-epithio-5α-pregnanes (I) prepared by the present invention show peculiar hormonal activities useful as medicinals especially for treatment in inflammatory diseases. For example, 2α,3α-epithio-17α-hydroxy-5α-pregnan-20-one and its 17-acetate each exhibited selective exudation inhibition without ill-effects such as granuloma weight decrease, adrenal atrophy, thymus degradation, etc. and 2α,3α-epithio-17α,21-dihydroxy-5α-pregnane-11,20-dione exhibited adrenal hypertrophy without other side-effect, when administered subcutaneously to rats each weighing 180 to 200 grams at a daily dose of 1 milligram for 10 consecutive days. Other 17α-oxygenated 2,3-epithio-5α-pregnanes of the present invention showed the similar activities. Accordingly, they can be used solely or in conjunction with such corticoids as cortisone, hydrocortisone, prednisolone, dexamethasone, betamethasone, triamcinolone, etc. for suppressing adrenal atrophy which is, as well known, a serious side effect of the corticoids.

The 17α-oxygenated 2,3-epithio-5α-pregnanes (I) of the present invention are used in medicine solely or in combination or in conjunction with an adrenal atrophic corticoid, in preparation in conjunction with solid or liquid pharmaceutical excipients. The preparations are prepared by as such known methods, for example, with the use of pharmaceutical organic or inorganic excipients suitable for parenteral, enteral or local administration. Suitable excipients are substances that do not react with the products of the present invention such for example, as water, vegetable oils, benzyl alcohol, polyethylene glycols, gelatin, lactose, starches, magnesium stearate, talc, white petroleum jelly, isopropyl myristate or other known pharmaceutical excipients. There are especially made preparation for parenteral administration, preferably solutions, above all oily or aqueous solutions furthermore suspensions, emulsions or implants; for enteral administration there are similarly also made tablets or dragees, and for local administration also ointments or creams. If desired, auxiliaries may be added thereto, such as preserving, stabilizing, wetting or emulsifying agents, salts for regulating the osmotic pressure, or buffers. They may also contain other therapeutically useful substances. The preparations are obtained in the customary way. The content of active compound in these preparations is preferably 1 to 500 mg. in a tablet, 0.5 to 10% in an ampoule, 0.5 to 15% in cream and ointment. The average dose for human adult is preferably 10 to 500 mg./day.

The following examples represent presently-preferred embodiments of the present invention, but it is to be understood that the examples are given by way of illustration only and not of limitation.

*Example 1*

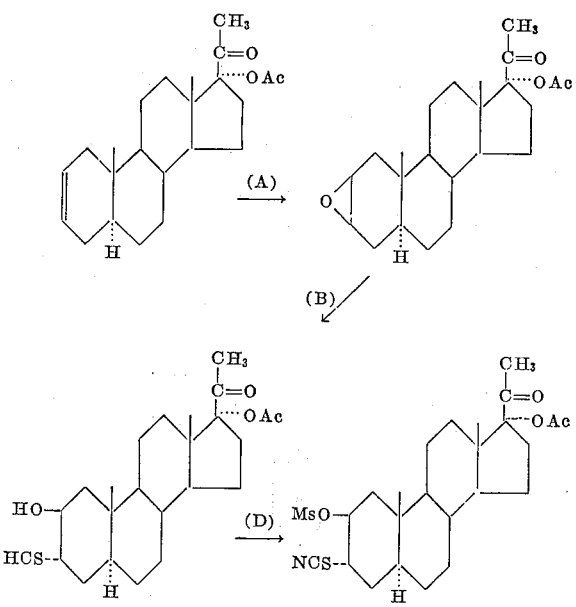

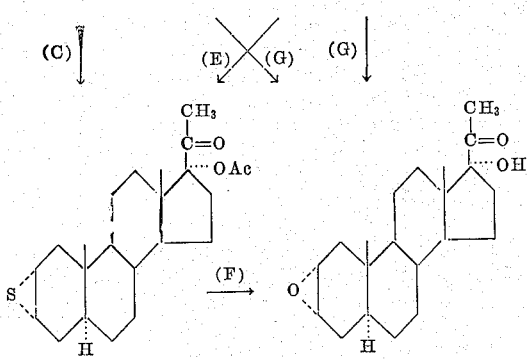

(A) *Preparation of 2β,3β-epoxy-17α-acetyloxy-5α-pregnan-20-one.*—To a solution of 17α-acetyloxy-5α-pregn-2-en-20-one [Chem. and Ind. 1961, 1962] (20.73 g.) in dioxane (160 ml.) while cooling with ice-water, there are added water (40 ml.), N-bromosuccinimide (13.5 g.) and 60% aqueous perchloric acid (4 ml.), and the resulting mixture is stirred for 1.5 hours. After addition of water and aqueous dilute sodium carbonate solution, the resultant crystalline substance is collected by filtration. The crude crystals are dissolved in dichloromethane, and the solution is dried over anhydrous sodium sulfate and distilled to remove solvent. The residue is crystallized from a mixture of dichloromethane and methanol to give crystalline 2β-hydroxy-3α-bromo-17α-acetyloxy-5α-pregnan-20-one (19.34 g.) melting at 220 to 222° C. (with decomposition). $[\alpha]_D^{22}$ +50.0±2° (c.=1.088, CHCl$_3$).

IR: $\nu_{max.}^{Nujol}$ 3544, 1728, 1267, 1253, 1027 cm.$^{-1}$

*Analysis.*—Calcd. for C$_{23}$H$_{35}$O$_4$Br: C, 60.65; H, 7.75; Br, 17.55%. Found: C, 60.89; H, 7.96; Br, 17.31%.

To a solution of the bromohydrin (19.04 g.) in anhydrous ethanol (200 ml.), there is added potassium acetate (20.5 g.), and the resulting mixture is heated while refluxing for 2 hours. The reaction mixture is mixed with aqueous dilute sodium carbonate solution and water while cooling with ice, and the resultant crystalline product is collected by filtration. The product is washed with water and dissolved in dichloromethane. The solution is dried over anhydrous sodium sulfate and distilled to remove solvent. The residue is crystallized from a mixture of dichloromethane and methanol to give crystalline 2β,3β-epoxy-17α-acetyloxy-5α-pregnan-20-one (13.22 g.) melting at 183 to 186° C. $[\alpha]_D^{24}$ +26.6±2° (c.=1.040, CHCl$_3$).

IR: $\nu_{max.}^{Nujol}$ 1728, 1717, 1274, 1264, 1250, 813, 805 cm.$^{-1}$

*Analysis.*—Calcd. for C$_{23}$H$_{34}$O$_4$: C, 73.76; H, 9.15%. Found: C, 73.64; H, 9.09%.

Alternatively the same product is obtained by treatment of 17α-acetyloxy-5α-pregn-2-en-20-one with N-bromosuccinimide in pyridine directly.

(B) *Preparation of 2β-hydroxy-3α-thiocyanato-17α-acetyloxy-5α-pregnan-20-one.*—To a solution of the epoxide prepared above (12.13 g.) in dichloromethane (50 ml.), there is added an ethereal solution of thiocyanic acid (prepared from 60 g. of potassium thiocyanate, 90 g. of phosphoric acid, 200 ml. of ether and small amount of water), and the resultant mixture is allowed to stand overnight at room temperature. The reaction mixture is washed with water, aqueous dilute sodium carbonate solution and water in order, dried over anhydrous sodium sulfate and concentrated. The residue is crystallized from ether to give 2β-hydroxy-3α-thiocyanato-17α-acetyloxy-5α-pregnan-20-one (11.465 g.) melting at 211 to 214° C. $[\alpha]_D^{24}$ +25.4±2° (c.=1.077, CHCl$_3$).

IR: $\nu_{max.}^{Nujol}$ 3434, 2172, 1729, 1698, 1258, 1250, 1027 cm.$^{-1}$

*Analysis.*—Calcd. for C$_{24}$H$_{35}$O$_4$NS: C, 66.48; H, 8.14; N, 3.23; S, 7.39%. Found: C, 66.78; H, 8.31; N, 3.42; S, 7.64%.

(C) *Preparation of 2α,3α-epithio-17α-acetyloxy-5α-pregnan-20-one.*—To a solution of above prepared thiocyanatohydrin (11.5 g.) in dioxane (130 ml.), there is added a solution of potassium carbonate (12 g.) in a mixture of water (60 ml.) and methanol (190 ml.), and the resultant mixture is stirred at room temperature for 100 minutes. The reaction mixture is diluted with water and the resultant crystalline product is filtered. The crystals are washed with water, dissolved in dichloromethane. The dichloromethane solution is dried over anhydrous sodium sulfate and concentrated. The residue is chromatographed over alumina (220 g., 5% wetted). The fraction eluted with solvent system of petroleum ether-benzene mixture (2:1 to 1:1) is crystallized from ether and recrystallized from a mixture of dichloromethane and methanol to give crystalline 2α,3α-epithio-17α-acetyloxy-5α-pregnan-20-one (8.018 g.) melting at 169 to 171° C. $[\alpha]_D^{24}$ +20.5±2° (c.=1.037, CHCl$_3$).

IR: $\nu_{max.}^{Nujol}$ 1738, 1710, 1248 cm.$^{-1}$

*Analysis.*—Calcd. for C$_{23}$H$_{34}$O$_3$S: C, 70.73; H, 8.77; S, 8.21%. Found: C, 70.46; H, 8.94; S, 8.25%.

(D) *Preparation of 2β-methanesulfonyloxy-3α-thiocyanato-17α-acetyloxy-5α-pregnan-20-one.*—To a solution of 2β-hydroxy-3α-thiocyanato-17α-acetyloxy-5α-pregnan-20-one (513 mg.) in pyridine (10 ml.), there is added methanesulfonyl chloride (0.5 ml.), and the resultant mixture is allowed to stand in a refrigerator overnight. After addition of ice-water, the resulting mixture is extracted with dichloromethane. The extract solution is washed with dilute hydrochloric acid, water, sodium carbonate solution and water in order, dried over anhydrous sodium sulfate and concentrated to give amorphous (crude) 2β-methanesulfonyloxy-3α-thiocyanato-17α-acetyloxy-5α-pregnan-20-one (503 mg.).

(E) *Preparation of 2α,3α-epithio-17α-acetyloxy-5α-pregnan-20-one.*—In a similar manner to the above (C), the above-prepared amorphous methanesulfonate (503 mg.) is treated with potassium carbonate (467 mg.) in a mixture of dioxane (25 ml.), water (10 ml.) and methanol (20 ml.) at room temperature for 1 hour. The product is crystallized from a mixture of dichloromethane and methanol to give crystalline 2α,3α-epithio-17α-acetyloxy-5α-pregnan-20-one (238 mg.) melting at 169 to 171° C.

(F) *Preparation of 2α,3α-epithio-17α-hydroxy-5α-pregnan-20-one.*—To a solution of above resulting epithio acetate (100 mg.) in dioxane (2 ml.), there is added 10% potassium hydroxide solution in methanol (2 ml.), and the resulting mixture is allowed to stand for 2 hours at room temperature (10 to 20° C.). The reaction mixture is diluted with water and the crystals formed are collected by filtration. The crystals are washed with water and dissolved in a mixture of dichloromethane and methanol. The solution is dried and concentrated. The residue is crystallized from methanol to give crystalline 2α,3α-epithio-17α-hydroxy-5α-pregnan-20-one (60 mg.) melting at 162 to 164/193 to 197° C. (double melting point).

IR: $\nu_{max.}^{Nujol}$ 3466, 1698, 1210, 1131 cm.$^{-1}$

*Analysis.*—Calcd. for C$_{21}$H$_{32}$O$_2$S: C, 72.37; H, 9.25; S, 9.20%. Found: C, 71.94; H, 9.27; S, 9.27%.

(G) *Preparation of 2α,3α-epithio-17α-hydroxy-5α-pregnan-20-one.*—In a similar manner to the above (F), 2β-hydroxy-3α-thiocyanato-17α-acetyloxy-5α-pregnan-20-one and 2β-methanesulfonyloxy-3α-thiocyanato-17α-acetyloxy-5α-pregnan-20-one each is converted to 2α,3α-epithio-17α-hydroxy-5α-pregnan-20-one.

Example 2

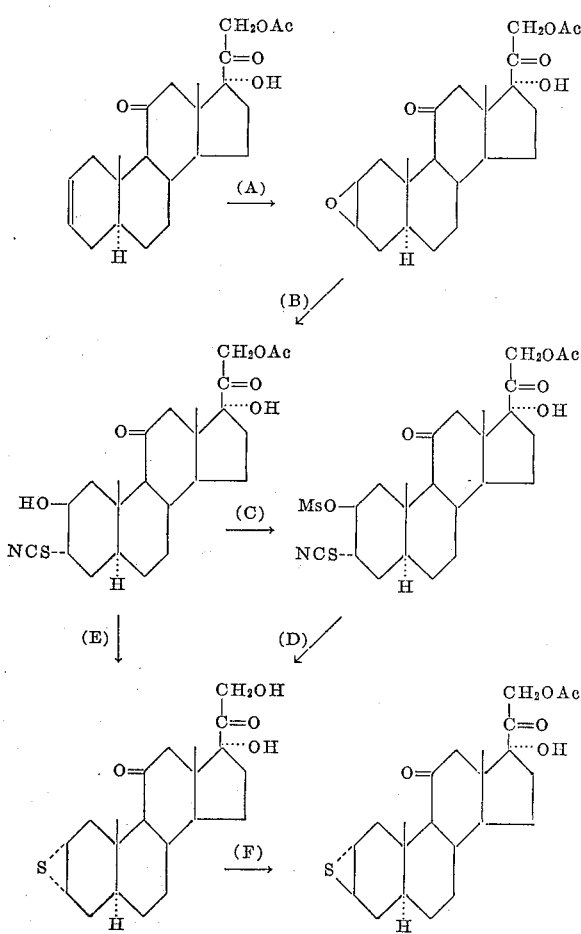

(A) *Preparation of 2β,3β,-epoxy-17α-hydroxy-21-acetyloxy-5α-pregnane-11,20-dione.*—To a solution of 17α-hydroxy-21-acetyloxy-5α-pregn-2-ene-11,20-dione [J. Org. Chem., 28, 3386 (1963)] (6.995 g.) in dioxane (200 ml.) while cooling with ice-water, there are added water (20 ml.), perchloric acid (60% aqueous solution, 3 ml.) and N-bromosuccinimide (3.75 g.), and the resulting mixture is stirred for 30 minutes. After addition of water, the resultant mixture is filtered. The collected substance is washed with water and dissolved in dichloromethane. The resulting solution is washed with sodium carbonate solution, dried over anhydrous sodium sulfate and concentrated. The residue is crystallized from ether to give crystalline 2β,17α-dihydroxy-3α-bromo-21 - acetyloxy-5α-pregnane-11,20-dione (6.570 g.) melting at 194 to 196° C. $[\alpha]_D^{24}$ +73.3±2° (c.=1.078, CHCl₃—MeOH (5:1)).

IR: $\nu_{max}^{Nujol}$ 3318, 3288, 1746, 1732, 1686, 1240 cm.⁻¹

*Analysis.*—Calcd. for $C_{23}H_{33}O_6Br$: C, 56.91; H, 6.85; Br, 16.46%. Found: C, 57.21; H, 6.79; Br, 16.64%.

To a solution of the bromohydrin (6.570 g.) in anhydrous ethanol (250 ml.), there is added potassium acetate (6.6 g.), and the resulting mixture is heated while refluxing for 1.5 hours. The reaction mixture is cooled, combined with water and extracted with a mixture of ether and dichloromethane. The extract is washed with sodium carbonate solution, dried over anhydrous sodium sulfate and concentrated. The residue is crystallized from ether to give crystalline 2β,3β-epoxy-17α-hydroxy-21-acetyloxy-5α-pregnane-11,20-dione (5.131 g.) melting at 233 to 236° C. $[\alpha]_D^{24}$ +107.1±2°) c.=1.077, CHCl₃).

IR: $\nu_{max}^{Nujol}$ 3438, 1734, 1720, 1704, 1272, 1247, 1233, 817, 812 cm.⁻¹

*Analysis.*—Calcd. for $C_{23}H_{32}O_6$: C, 68.29; H, 7.97%. Found: C, 68.29; H, 7.95%.

(B) *Preparation of 2β,17α-dihydroxy-3α-thiocyanato-21-acetyloxy-5α-pregnane-11,20-dione.*—To a solution of the epoxide prepared above (878 mg.) in dichloromethane (50 ml.), there is added an ethereal solution of thiocyanic acid prepared from potassium thiocyanate (4.4 g.) and phosphoric acid (6.6 g.) in ether (25 ml.) and the resultant mixture is allowed to stand at room temperature overnight. The reaction mixture is washed with sodium carbonate solution and water in order, dried over anhydrous sodium sulfate and concentrated. The residue is crystallized from benzene and recrystallized from a mixture of acetone and hexane to give crystalline 2β,17α-dihydroxy-3α - thiocyanato - 21-acetyloxy-5 - pregnane-11,20-dione (591 mg.) melting at 226 to 228° C. $[\alpha]_D^{23}$ +124.7±4° (c.=1.030, CHCl₃).

IR: $\nu_{max}^{Nujol}$ 3453, 2163, 1731, 1703, 1266, 1243, 1233 cm.⁻¹

*Analysis.*—Calcd. for $C_{24}H_{33}NO_6S$: C, 62.18; H, 7.18; N, 3.02; S, 6.92%. Found: C, 62.05; H, 7.20; N, 3.00; S, 6.79%.

(C) *Preparation of 2β-methanesulfonyloxy - 3α-thiocyanato-17α-hydroxy - 21-acetyloxy - 5α-pregnane-11,20-dione.*—To a solution of the thiocyanatohydrin prepared above (299 mg.) in pyridine (7 ml.), there is added methanesulfonyl chloride (0.3 ml.), and the resultant mixture is allowed to stand in a refrigerator overnight. After addition of ice-water, the resulting mixture is extracted with dichloromethane, washed with hydrochloric acid, water, sodium carbonate solution and water in order, dried over anhydrous sodium sulfate and concentrated. The residue is crystallized from a mixture of acetone and hexane to give crystalline 2β-methanesulfonyloxy-3α-thiocyanato - 17α-hydroxy - 21-acetyloxy - 5α-pregnane-11,20-dione (279 mg.) melting at 191 to 194° C. $[\alpha]_D^{23}$ +92.8±2° (c.=1.010, CHCl₃).

IR: $\nu_{max}^{Nujol}$ 3389, 2161, 1746, 1732, 1681, 1237, 1226, 1178 cm.⁻¹

*Analysis.*—Calcd. for $C_{25}H_{35}NO_8S_2$: C, 55.43; H, 6.51; N, 2.59; S, 11.84%. Found: C, 55.52; H, 6.49; N, 2.60; S, 11.66%.

(D) *Preparation of 2α,3α-epithio-17α,21-dihydroxy-5α-pregnane-11,20-dione.*—To a solution of the above obtained methanesulfonate (129 mg.) in dioxane (14 ml.), there is added a solution of potassium carbonate (66 mg.) in water (6 ml.), and the resultant mixture is stirred at room temperature (10 to 20° C.) for 60 hours. The reaction mixture is poured into water. The resulting mixture is shaken with dichloromethane. The dichloromethane layer is concentrated and the residue is crystallized from a ximture of acetone and hexane to give crystalline 2α,3α - epithio-17α,21-dihydroxy-5α-pregnane-11,20-dione (67 mg.) melting at 152 to 154° C. $[\alpha]_D^{23}$ +75.7±2° (c.=1.100, CHCl₃).

IR: $\nu_{max}^{Nujol}$ 3485, 3355, 1703, 1694, 1048, 913, 898 cm.⁻¹

*Analysis.*—Calcd. for $C_{21}H_{30}O_4S$: C, 66.63; H, 7.99; S, 8.47%. Found: C, 66.65; H, 8.16; S, 8.83%.

(E) *Preparation of 2α,3α-epithio-17α,21-dihydroxy-5α-pregnane-11,20-dione.*—To a solution of 2β,17α - dihydroxy-3α-thiocyanato - 21-acetyloxy - 5α-pregnane-11,20-dione (201 mg.) in dioxane (30 ml.), there is added a solution of potassium carbonate (32 mg.) in a mixture of water (1 ml.) and methanol (5 ml.), and the resulting mixture is stirred at room temperature (10 to 20° C.) overnight. The reaction mixture is diluted with water and extracted with dichloromethane. The extract is concentrated and the residue is crystallized from a mixture of acetone and hexane to give crystalline 2α,3α-epithio-17α,21-dihydroxy-5α - pregnane-11,20-dione (125 mg.) melting at 152 to 154° C.

(F) *Preparation of 2α,3α-epithio-17α,21-dihydroxy-5α-pregnane-11,20-dione 17-acetate.*—A mixture of 2α,3α-epithio-17α-21-dihydroxy-5α-pregnane-11,20-dione (56 mg.), acetic anhydride (0.5 ml.) and pyridine (1 ml.) is allowed to stand overnight at room temperature. The reaction mixture is diluted with water containing ice pieces and extracted with ether. The extract is washed with dilute hydrochloric acid and water in order, dried over anhydrous sodium sulfate and evaporated. The residue is crystallized from a mixture of methanol and acetone to give crystalline 2α,3α-epithio-17α,21-dihydroxy-5α-pregnane-11,20-dione 17-acetate.

In a similiar manner as above, 2α,3α-epithio-17α,21-dihydroxy-5α-pregnane-11,20-dione is converted to the corresponding 17-propionate (using propionic anhydride instead of acetic anhydride, 17-butyrate (using butyric anhydride instead of acetic anhydride) and 17-trimethyl-acetate (using trimethylacetyl chloride instead of acetic anhydride).

Example 3

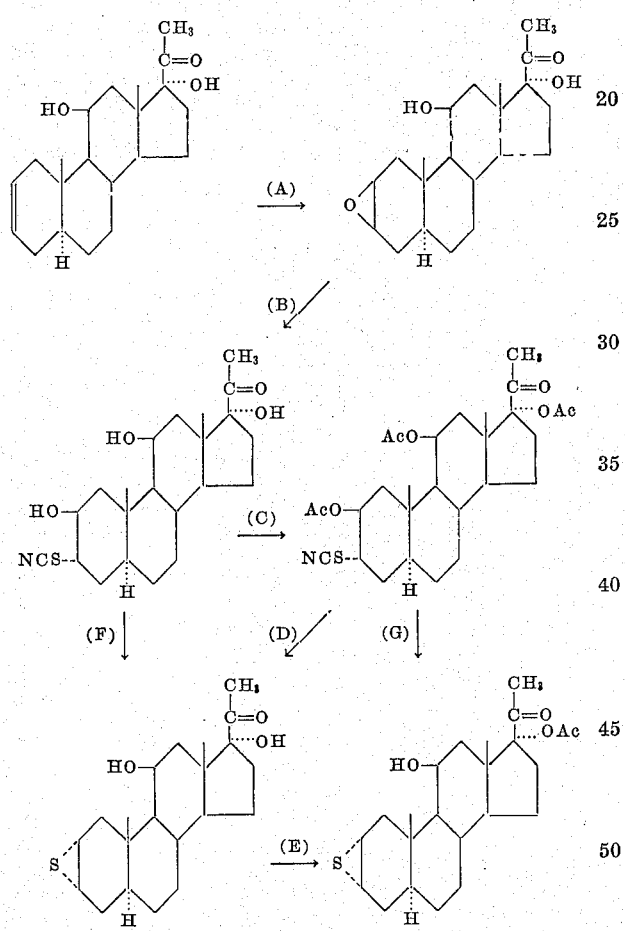

(A) *Preparation of 2β,3β-epoxy-11β,17α-dihydroxy-5α-pregnan-20-one.*—To a solution of 11β,17α-dihydroxy-5α-pregn-2-en-20-one (10.33 g.) in dioxane (100 ml.) while cooling with ice-water, there are added water (20 ml.), N-bromosuccinimide (6.5 g.) and 60% aqueous perchloric acid (2 ml.), and the resulting mixture is stirred for 1.5 hours. The reaction mixture is treated thereafter in a manner similar to Example 1(A), thereby crystalline 2β,11β,17α - trihydroxy - 3α - bromo - 5α - pregnan - 20 - one is obtained.

To a solution of the bromohydrin (8.6 g.) in anhydrous ethanol (100 ml.), there is added potassium acetate (10.0 g.), and the resulting mixture is heated while refluxing for 2 hours. The reaction mixture is treated thereafter in a similar manner to Example 1(A), to give crystalline 2β,3β-epoxy-11β,17α-dihydroxy-5α-pregnan-20-one.

(B) *Preparation of 2β,11β,17α-trihydroxy-3α-thiocyanato-5α-pregnan-20-one.*—In a similar manner to Example 1(B), the 2,3-epoxide is treated with thiocyanic acid in a mixture of ether and dichloromethane at room temperature to give crystalline 2β,11β,17α-trihydroxy-3α-thiocyanato-5α-pregnan-20-one.

(C) *Preparation of 2β,11β,17α-triacetyloxy-3α-thiocyanato-5α-pregnan-20-one.*—A solution of the above obtained thiocyanatohydrin (0.6 g.) in a mixture of acetic anhydride (10 ml.) and small amount of p-toluenesulfonic acid is heated on a water bath for 1 hour. The reaction mixture is concentrated under reduced pressure at the same temperature and diluted with ice-water. The mixture is neutralized with sodium carbonate and extracted with chloroform. The chloroform layer is washed with dilute hydrochloric acid and water in order, dried over anhydrous sodium sulfate and distilled to remove solvent. The residue is crystallized from a mixture of acetone and hexane to give crystalline 2β,11β,17α-triacetyloxy-3α-thiocyanato-5α-pregnan-20-one.

(D) *Preparation of 2α,3α-epithio-11β,17α-dihydroxy-5α-pregnan-20-one.*—In a similar manner to Example 1(F) the above-obtained thiocyanatohydrin triacetate is treated with potassium hydroxide in dioxane-methanol-water mixture at room temperature to give 2α,3α-epithio-11β,17α-dihydroxy-5α-pregnan-20-one.

(E) *Preparation of 2α,3α-epithio-11β,17α-dihydroxy-5α-pregnan-20-one 17-acetate.*—In a similar manner to the above (C), the 2,3-epithio product obtained in (D) is acetylated to give the corresponding monoacetate, 2α,3α-epithio-11β-hydroxy-17α-acetyloxy-5α-pregnan-20-one.

(F) *Preparation of 2α,3α-epithio-11β,17α-dihydroxy-5α-pregnan-20-one.*—In a similar manner to Example 1(F), the free thiocyanatohydrin, 2β,11β,17α-trihydroxy-3α-thiocyanato-5α-pregnan-20-one is treated with potassium hydroxide in dioxane-methanol-water mixture to give 2α,3α-epithio-11β,17α-dihydroxy-5α-pregnan-20-one.

(G) *Preparation of 2α,3α-epithio-11β,17α-dihydroxy-5α-pregnan-20-one 17-acetate.*—In a similar manner to Example 1(C), 2β,11β,17α-triacetyloxy-3α-thiocyanato-5α-pregnan-20-one is treated with potassium carbonate in a mixture of dioxane, water and methanol at room temperature to give 2α,3α-epithio-11β,17α-dihydroxy-5α-pregnan-20-one.

What is claimed is:

1. A 2,3-epithio-steroid of the formula:

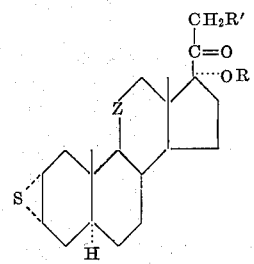

wherein R is a hydrogen atom or a lower alkanoyl group, R' is a hydrogen atom, a hydroxy group or a lower alkanoyloxy group and Z is a methylene group, a carbonyl group, a hydroxymethylene group or a lower alkanoyloxymethylene group.

2. A 2,3-epithio-steroid claimed in claim 1, wherein R and R' each is a hydrogen atom and Z is a methylene group, namely 2α,3α-epithio-17α-hydroxy-5α-pregnan-20-one.

3. A 2,3-epithio-steroid claimed in claim 1, wherein R is a lower alkanoyl, R' is a hydrogen atom and Z is a methylene group, namely 2α,3α-epithio-17α-hydroxy-5α-pregnan-20-one 17-lower alkanoate.

4. A 2,3-epithio-steroid claimed in claim 1, wherein R is acetyl, R' is a hydrogen atom and Z is a methylene group, namely 2α,3α-epithio-17α-hydroxy-5α-pregnan-20-one 17-acetate.

5. A 2,3-epithio-steroid claimed in claim 1, wherein R is a hydrogen atom, R' is a hydroxy group and Z is a carbonyl group, namely 2α,3α-epithio-17α,21-dihydroxy-5α-pregnane-11,20-dione.

6. A 2,3-epithio-steroid claimed in claim 1, wherein R is a hydrogen atom, R' is a lower alkanoyloxy group and Z is a carbonyl group, namely 2α,3α-epithio-17α,21-dihydroxy-5α-pregnane-11,20-dione 17-lower alkanoate.

7. A 2,3-epithio-steroid claimed in claim 1, wherein R is a hydrogen atom, R' is acetyloxy group and Z is a carbonyl group, namely 2α,3α-epithio-17α,21-dihydroxy-5α-pregnane-11,20-dione 17-acetate.

8. A 3α-thiocyanato-steroid of the formula:

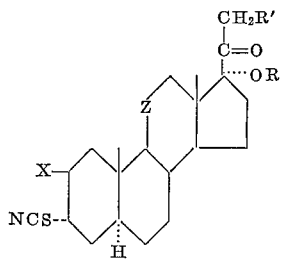

wherein R is a hydrogen atom or a lower alkanoyl group, R' is a hydrogen atom, a hydroxy group or a lower alkanoyloxy group, X is a halogen atom, a hydroxy group, a lower alkanoyloxy group, a lower alkanesulfonyloxy group, a benzenesulfonyloxy group or a lower alkylbenzenesulfonyloxy group, and Z is a methylene group, a carbonyl group, a hydroxymethylene group or a lower alkanoyloxymethylene group.

9. A 3α-thiocyanato-steroid claimed in claim 8, wherein R and R' each is a hydrogen atom, X is a hydroxy group and Z is a methylene group, namely 3α-thiocyanato-2β,17α-dihydroxy-5α-pregnan-20-dione.

10. A 3α-thiocyanato-steroid claimed in claim 8, wherein R is a lower alkanoyl group, R' is a hydrogen atom, X is a hydroxy group and Z is a methylene group, namely 3α - thiocyanato-2β,17α-dihydroxy-5α-pregnan-20-one 17-lower alkanoate.

11. A 3α-thiocyanato-steroid claimed in claim 8, wherein R is acetyl, R' is a hydrogen atom, X is a hydroxy group and Z is a methylene group, namely 3α-thiocyanato-2β,17α-dihydroxy-5α-pregnan-20-one 17-acetate.

12. A 3α-thiocyanato-steroid claimed in claim 8, wherein R is a hydrogen atom, R' and X each is a hydroxy group and Z is a carbonyl group, namely 3α-thiocyanato-2β,17α,21-trihydroxy-5α-pregnane-11,20-dione.

13. A 3α-thiocyanato-steroid claimed in claim 8, wherein R is a hydrogen atom, R' is a lower alkanoyloxy group, X is a hydroxy group and Z is a carbonyl group, namely 3α-thiocyanato-2β,17α,21-trihydroxy-5α-pregnane - 11,20-dione 17-lower alkanoate.

14. A 3α-thiocyanato-steroid claimed in claim 8, wherein R is a hydrogen atom, R' is acetyloxy, X is a hydrogen atom and Z is a carbonyl group, namely 3α-thiocyanato-2β,17α,21-trihydroxy-5α-pregnane-11,20-dione 17-acetate.

15. A 2,3-epoxy-steroid of the formula:

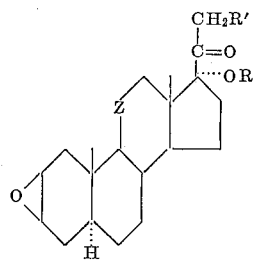

wherein R is a hydrogen atom or a lower alkanoyl group, R' is a hydrogen atom, a hydroxy group or a lower alkanoyloxy group and Z is a methylene group, a carbonyl group, a hydroxymethylene group or a lower alkanoyloxymethylene group.

16. A 2,3-epoxy-steroid claimed in claim 15, wherein R and R' each is a hydrogen atom and Z is a methylene group, namely 2β,3β-epoxy-17α-hydroxy-5α-pregnan-20-one.

17. A 2,3-epoxy-steroid claimed in claim 15, wherein R is a lower alkanoyl, R' is a hydrogen atom and Z is a methylene group, namely 2β,3β - epoxy-17α-hydroxy-5α-pregnan-20-one 17-lower alkanoate.

18. A 2,3-epoxy-steroid claimed in claim 15, wherein R is acetyl, R' is a hydrogen atom and Z is a methylene group, namely 2β,3β - epoxy-17α-hydroxy-5α-pregnan-20-one 17-acetate.

19. A 2,3-epoxy-steroid claimed in claim 15, wherein R is a hydrogen atom, R' is a hydroxy group and Z is a carbonyl group, namely 2β,3β-epoxy-17α,21-dihydroxy-5α-pregnane-11,20-dione.

20. A 2,3-epoxy-steroid claimed in claim 15, wherein R is a hydrogen atom, R' is a lower alkanoyloxy group, and Z is a carbonyl group, namely 2β,3β-epoxy-17α,21-dihydroxy-5α-pregnane-11,20-dione 17-lower alkanoate.

21. A 2,3-epoxy-steroid claimed in claim 15, wherein R is a hydrogen atom, R' is acetyloxy and Z is a carbonyl group, namely 2β,3β - epoxy-17α,21-dihydroxy-5α-pregnane-11,20-dione 17-acetate.

22. A 2β-hydroxy-3α-halogeno-steroid of the formula:

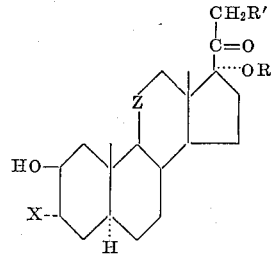

wherein R is a hydrogen atom or a lower alkanoyl group, R' is a hydrogen atom, a hydroxy group or a lower alkanoyloxy group, X is a halogen atom and Z is a methylene group, a carbonyl group, a hydroxymethylene group or a lower alkanoyloxymethylene group.

23. A 2β-hydroxy-3α-halogeno-steroid claimed in claim 22, wherein R and R' each is a hydrogen atom, X is bromine and Z is a methylene group, namely 2β,17α-dihydroxy-3α-bromo-5α-pregnan-20-one.

24. A 2β-hydroxy-3α-halogeno-steroid claimed in claim 22, wherein R is a lower alkanoyl group, R' is a hydrogen atom, X is bromine and Z is a methylene group, namely 2β,17α-dihydroxy-3α-bromo - 5α - pregnan-20-one 17-lower alkanoate.

25. A 2β-hydroxy-3α-halogeno-steroid claimed in claim 22, wherein R is acetyl, R' is a hydrogen atom, X is bromine and Z is a methylene group, namely 2β,17α-dihydroxy-3α-bromo-5α-pregnan-20-one 17-acetate.

26. A 2β-hydroxy-3α-halogeno-steroid claimed in claim 22, wherein R is a hydrogen atom, R' is a hydroxy group, X is bromine and Z is a carbonyl group, namely 2β,17α,21-trihydroxy-3α-bromo-5α-pregnane-11,20-dione.

27. A 2β-hydroxy-3α-halogeno-steroid claimed in claim 22, wherein R is a hydrogen atom, R' is a lower alkanoyloxy group, X is bromine and Z is a carbonyl group, namely 2β,17α,21 - trihydroxy-3α-bromo - 5α - pregnane-11,20-dione 21-lower alkanoate.

28. A 2β-hydroxy-3α-halogeno-steroid claimed in claim 22, wherein R is a hydrogen atom, R' is acetyloxy, X is bromine and Z is a carbonyl group, namely 2β,17α,21-trihydroxy-3α-bromo-5α-pregnane-11,20-dione 21-acetate.

No references cited.

LEWIS GOTTS, *Primary Examiner.*

JOHNNIE R. BROWN, *Assistant Examiner.*